United States Patent [19]

Lair

[11] Patent Number: 5,221,048
[45] Date of Patent: Jun. 22, 1993

[54] VARIABLE AREA EXHAUST NOZZLE

[76] Inventor: Jean-Pierre Lair, 100 W. El Prado, Suite 308, San Antonio, Tex. 78212

[21] Appl. No.: 741,647

[22] Filed: Aug. 7, 1991

[30] Foreign Application Priority Data

May 21, 1991 [FR] France .................. 91 06138

[51] Int. Cl.⁵ .............................................. B64C 15/00
[52] U.S. Cl. .......................... 239/265.37; 239/265.33; 239/265.19; 60/271
[58] Field of Search ....................... 239/265.19, 265.33, 239/265.35, 265.37; 60/232, 271

[56] References Cited

U.S. PATENT DOCUMENTS 4,577,814 3/1986 Bayle-Laboure et al. ..... 239/265.19

FOREIGN PATENT DOCUMENTS 586571 3/1947 United Kingdom ........... 239/265.37
588501 5/1947 United Kingdom ........... 239/265.37

Primary Examiner—Andres Kashnikow
Assistant Examiner—Lesley D. Morris
Attorney, Agent, or Firm—Harold H. Dutton, Jr.

[57] ABSTRACT

A variable area exhaust nozzle for aircraft jet engines for optimizing thrust of the engines under different conditions, the nozzle having a fixed wall (11) and at the end thereof, two pivoting half shells (13) hinged around an axis of rotation A interdependent of the fixed wall, and having lateral edges (18) which are inserted into sliding tracks mounted in fixed beams (12), also interdependently of the fixed wall. A seal (35) ensures airtightness between the fixed wall (11) and the pivoting half shells (13).

10 Claims, 6 Drawing Sheets

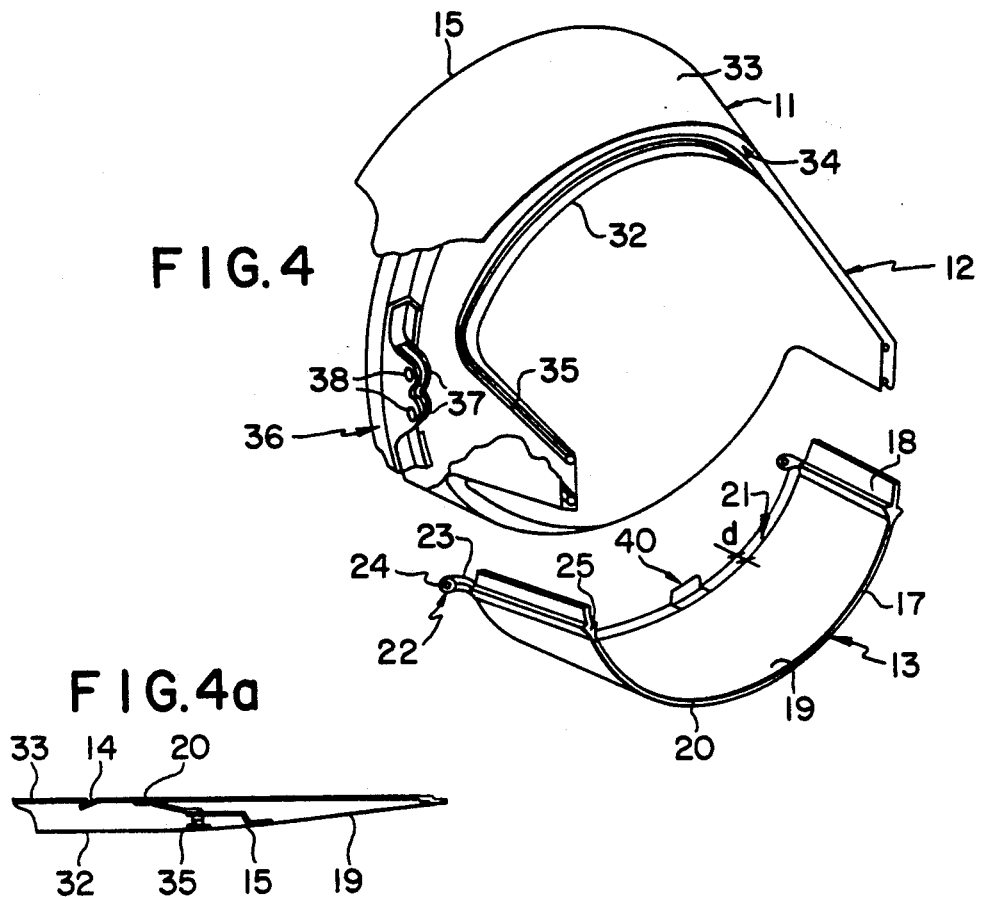
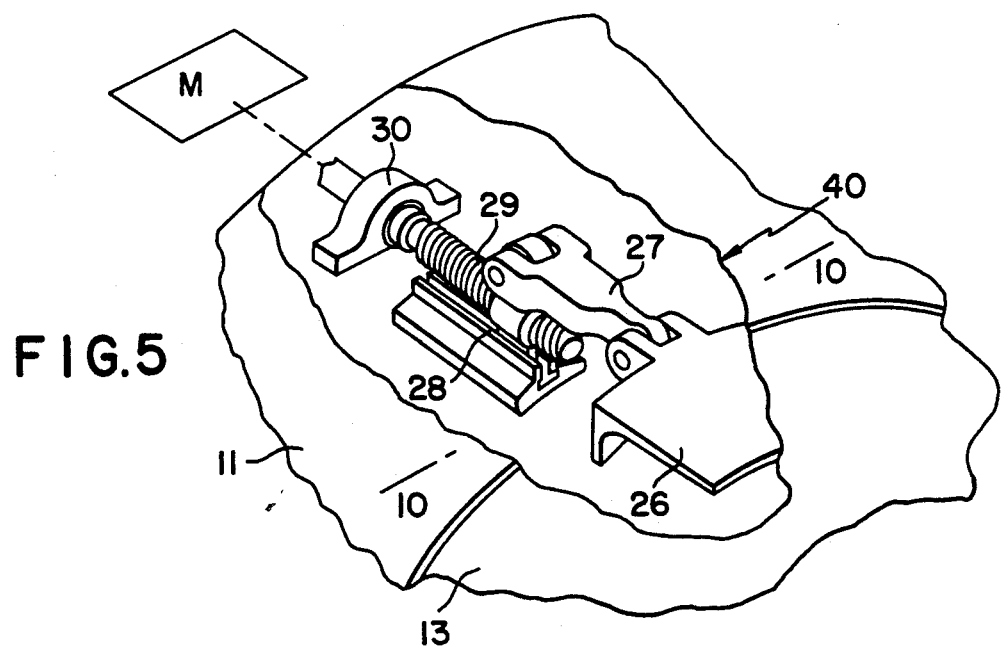

VARIABLE AREA EXHAUST NOZZLE

The present invention relates to a variable area exhaust nozzle for jet engines. Such a nozzle is more particularly intended for business aircraft and commercial aircraft, especially for optimizing their cruise performance as well as their take off and climb performance.

BACKGROUND AND OBJECTS OF THE INVENTION

It is known that the maximum thrust of jet engines is reached when the ITT (inter stage turbine) limit temperature, or EGT (exhaust gas temperature), and the limit rotational speed N1 of the fan is reached. These two limits ITT and N1 are exceptionally concomitant. In particular, the take off thrust under high outside temperatures is usually limited by the ITT or EGT limit temperatures even though the limit rotational speed N1 of the fan is not yet reached.

Consequently, for an aircraft of a given weight, it is more difficult to take off from an airport located in a hot country than from an airport located in a cold country. The decrease of the maximum thrust of the aircraft in these hot countries leads to an increase of the take off time, thus longer runways and a higher fuel consumption are required.

It is known that at take off and climb, the optimum exit area of the exhaust nozzle of the jet engine to produce the maximum thrust, is different from the optimum nozzle exhaust area required for the cruise flight conditions. The exhaust nozzles of jet engines for business or commercial aircraft are of the fixed type and consequently are designed to ensure the best performance compromise between take off, climb and cruise conditions. When this compromise is more difficult to satisfy, the engine manufacturer equips the engines with convergent/divergent nozzles. The objective of such nozzles is to increase their mass flow coefficient and their thrust coefficient at relatively low engine pressure ratios. These low engine pressure ratios are typical of take off conditions. For flight cruise conditions, the engine pressure ratios are higher and the performance impact of the convergent/divergent is often negative. In order to find a good nozzle operating compromise, the manufacturers work with the percentage of convergence/divergence, so that this percentage will be high enough to improve the thrust during take off, and low enough so that the cruise performance is not too greatly reduced. Yet, this compromise is no more than a stopgap measure, insofar as the maximum thrust of the aircraft is definitively limited by the fixed shape of the nozzle.

It is already known, for aircraft other than business or commercial, and particularly for military aircraft, to use variable area exhaust nozzles. Since the thrust of the aircraft is directly proportional to the area of its nozzle, it is then possible in modulating the exhaust area of the nozzle to choose the optimum thrust adapted to the outside air temperature conditions.

The variable area exhaust nozzles known to date allow large variations of the area of the nozzles, and are comprised of a large number of flaps which prevent their use on business or commercial aircraft, because of their high weight and their complexity. That is why variable area exhaust nozzles have not yet been adapted either on business aircraft or on commercial aircraft.

U.S. Pat. No. 4,577,814 (SNECMA) describes a variable area exhaust nozzle for a military aircraft. This nozzle is extended by a half movable shell supported by a half fixed shell. However, the thrust generated by such a nozzle in the deployed position is misaligned relative to the longitudinal axis of the aircraft. With consideration of a military aircraft, such a misaligned thrust is an advantage which increases the handling of the aircraft. Yet for a business or commercial aircraft, such a misaligned thrust is to be avoided, since the side component of this thrust does not participate to the improvement of the optimum thrust of the engine.

The objective of the present invention is to overcome all these drawbacks, and notably to design a variable area exhaust nozzle for business or commercial aircraft, allowing these aircraft to fly with an optimum thrust in all phases of the flight, i.e. take off, climb, cruise and landing. It is also our objective to increase the value of the maximum thrust, without misaligning it, relative to the axis of the aircraft, and also to design a variable exhaust nozzle easy to manufacture, of low weight, and easy to operate.

DESCRIPTION OF THE INVENTION

In this respect, the present invention relates to a variable area exhaust nozzle of the type comprising:

a fixed nozzle wall, a pivoting half shell having a concave face and a convex face, positioned in the prolongation of the fixed wall, and hinged around a rotational axis, located upstream of the half shell and attached to the fixed wall, pivoting means for the half shell, attached on one hand, on an upstream edge of the half shell and, on the other hand, on the fixed wall and adapted to drive the half shell into rotation relative to the fixed wall according to a plurality of positions between a stowed position in which the exhaust area of the nozzle is minimum and a deployed position in which the exhaust area is maximum, a seal located on the fixed wall and contacting the half pivoting shell, a second pivoting half shell having its concave face facing the concave face of the other half shell, and hinged by its upstream part on the fixed wall, two fixed beams extending rearward of the fixed wall between the two half shells and structured in the shape of overlapping tracks adapted to receive the side edges of each half shell, and seals located inside the sliding tracks, and contacting the side edges of each half shell.

Consequently, the rotation of each half shell, relative to the axis of rotation interdependent of the fixed wall, induces an increase or a decrease of the nozzle exhaust area. This variation of the area of the nozzle is accompanied by the sliding of the side edges of the half shells in the tracks of the fixed beams advantageously fitted, for this purpose, with a seal. As a result, in spite of the opening of the two half shells, no air leak is permitted between the two half shells. Besides, the opening of the two half shells being synchronized by the rotating means, the thrust produced by such a nozzle does not suffer any misalignment.

Advantageously, the sealing of the two pivoting half shells, relative to the fixed parts, is realized for each of the half shells by one single seal extending on the periphery of the fixed parts and contacting with the half shell.

Such a nozzle presents the advantage in the stowed position, not to suffer any aerodynamic discontinuities, because of the presence of the half pivoting shells. In fact the sliding tracks, in combination with the side edges of the half shells, ensure a good continuity of the air stream in the vicinity of the fixed beams.

In the deployed position, the aerodynamic discontinuities generated by the half shells are very limited.

Advantageously, the desired nozzle area variations, in the framework of the present invention, are purposely limited, and can be on the order of 15% of the initial exhaust nozzle area. The resulting increase of take off thrust under high outside air temperature is of course dependent of the engine type, but can be greater than 5%. At cruise, the engine performances are optimum since the initial nozzle exhaust area is specifically optimized for this flight condition.

The pivoting shells allowing the execution of such area variations are consequently of small dimensions, which enable a small weight increase, a simple rotating driving mechanism, and a better aerodynamic nozzle control.

Other objects, characteristics and advantages will become apparent from the following description in reference to the accompanying drawings, in which:

BRIEF DESCRIPTION OF THE DRAWINGS

FIG. 4 is a fragmentary perspective view showing the attachment of a half pivoting shell on the nozzle fixed wall;

FIG. 4a is a cross-section showing the overlapping of the peripheral zone of a pivoting half shell relative to the fixed wall;

FIG. 5 is a perspective view on a larger scale showing the rotating means according to the invention;

DETAILED DESCRIPTION OF PREFERRED EMBODIMENTS

Figure 1:
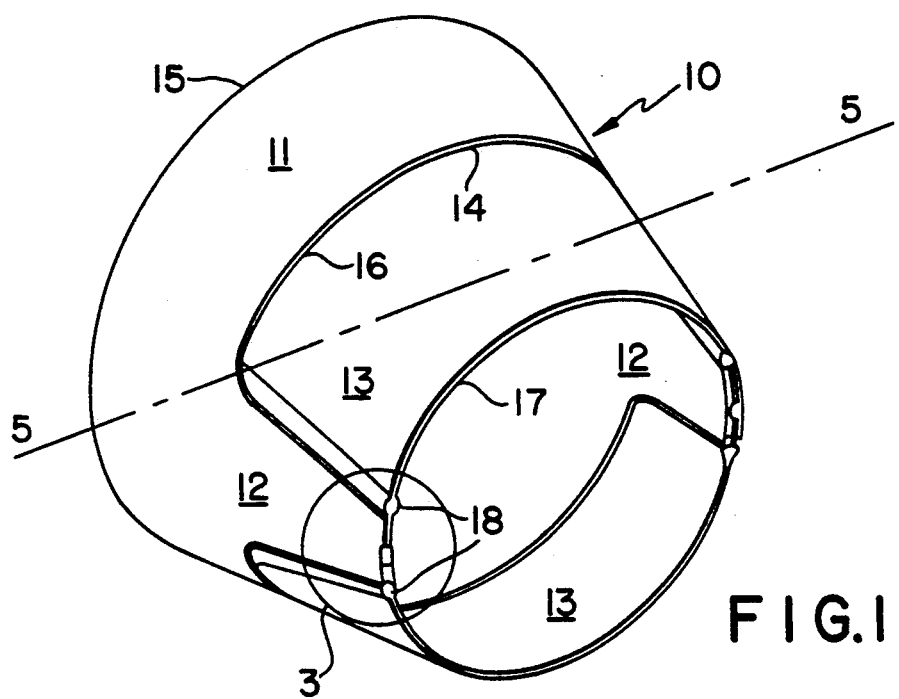
FIG. 1 is a perspective view of a nozzle according to the invention, in the stowed position.

According to the first embodiment shown in FIGS. 1 to 5, the variable nozzle 10 is comprised of a fixed nozzle wall 11, having a shape which is globally hemi-truncated and provided with two rigid extensions extending rearward and called fixed beams 12, and two identical pivoting half shells 13, hinged around a diametrical axis of rotation A interdependent of the fixed wall.

Each half shell 13 is substantially semi-truncated, with a concave face, a convex face, an upstream edge 16, a downstream edge 17 and two side edges 18.

As better seen in FIG. 4, each half shell is facing the other, so that the two concave faces 14 are facing one another. Each half shell is composed of an internal envelope 19 and an external envelope 20. These two envelopes form between them a free space 21 which becomes thinner from the upstream edge to the downstream edge, and from the middle of the upstream edge (or downstream) toward each side edge 18.

At the junction of the upstream edge 16 with each side edge 18, one can find a rotating means 22 inserted in the free space 21. This rotating means is structurally attached to the interior of the free space 21 on each of the internal and external envelopes 19 and 20. Each rotating means 22 is composed of an extension 23 fitted with a bore 24 having an axis which is parallel to the rotating axis A.

The internal and external envelopes 19 and 20 are joined together at the level of each side edge 18, by a double close out 25. The extreme portions of each of the envelopes are thus joined, to form each side edge 18.

Advantageously, each side edge 18 presents an increasing width from the upstream edge 16 of the half shell to its downstream edge 17.

One will note that the external envelope 20 is longer than the internal envelope 19 at the level of the upstream edge 16, so that the internal envelope is notably recessed, or a recessed distance called d, from the external envelope. The external envelope defines consequently a recessed zone.

Besides, each half shell is provided with a pivoting means 40 (FIGS. 4 and 5) comprised of a support 26 fixed, for example, in the middle of the upstream edge of the external envelope 20 of each half shell, and presenting a rotation axis B parallel to the rotation axis A, a driving assembly 27 with one end attached to the B axis, and which second end is constituted by a nut 28 moving along an endless screw 29. The endless screw is driven in rotation by a motor M (schematically represented in FIG. 5). The endless screw 29 is, moreover, made interdependent of the fixed wall 11 by supporting legs 30 and 31.

The fixed wall 11 (FIG. 4) is constituted of an internal envelope 32 and an external envelope 33. The downstream edge of the external envelope 33 is advantageously located upstream of the downstream edge of the internal envelope 32. Between these two envelopes is found a free space 34.

The internal periphery of the fixed parts of the nozzle, according to the invention, is equipped with a continuous one piece seal 35, for each of the half shells. These fixed portions are constituted by the downstream edge of the fixed wall 11 in contact with an upstream edge of a pivoting half shell 13, and the edge of the fixed beams 12 in contact with each side edge 18 of this half pivoting shell.

At the level of the fixed wall of the nozzle 11, and in the free space 34, are found two support fittings of the rotation axis 36, disposed along the axis o rotation A, and diametrically opposed. Each of these support fittings 36 is provided with two flanges 37 extending perpendicularly to the rotation axis A and parallel to one another. Each of these flanges is drilled with two bores 38 parallel to one another, and generally extending according to the rotation axis A that they define.

These support fittings 36 are located in the free space 34, at a certain distance from the downstream edges of the fixed wall. Advantageously, this distance corresponds to the recessing distance d, between the internal and external envelopes of the half pivoting shells.

The external and internal envelopes of the fixed beams 12 constitute overlapping sliding tracks, adapted to enclose the side edges 18 of the half shells.

The assembly and the operation of such a nozzle are explained hereafter.

The rotating means 22 of each half shell 13 are mounted between, the flanges 37 of the rotation axis supports 36. A shaft on axes A is maintained in position therein through bores 38 and 24.

The pivoting means 40 are installed such that the nut 28 can move along the endless screw 29, when the latter is driven into rotation.

The side edges 18 of the half shells are inserted between the internal 32 and external 33 envelopes of the fixed beams. The seal 35 is in contact with the side edges 18 of the half shells, and ensure airtightness of the fixed beams 12 in relation to the moving parts, i.e. half shells 13, in their longitudinal zones. In the peripheral zone (FIG. 4a) of the foxed nozzle 11, the sealing between the fixed nozzle and the movable nozzle is further ensured by a portion of the recessing zone. The seal 35, in its peripheral portion constantly remains in contact with the internal envelope 19 in a portion of the recessing zone for all angular positions of the half movable shells 13.

The recessing distance d, between the two envelopes, external 20 and internal 19, allows to locate the rotation axis A of the half shells notably forward (upstream) of each half shell. The upstream edge of the internal envelope 19 of each half shell 13 is facing the downstream edge of the internal envelope of the fixed wall 11, the recessing zone covers the seal 35 in all its peripheral part, whereas the upstream edge of the external envelope 20 is inserted in the free space 34. A good continuity of the airstream is thus ensured at the junction of the fixed wall and beam parts 11, 12 and the movable half shell parts 13 of the nozzle in the longitudinal and peripheral zones.

The operation of such a nozzle is explained hereafter.

Figure 2:
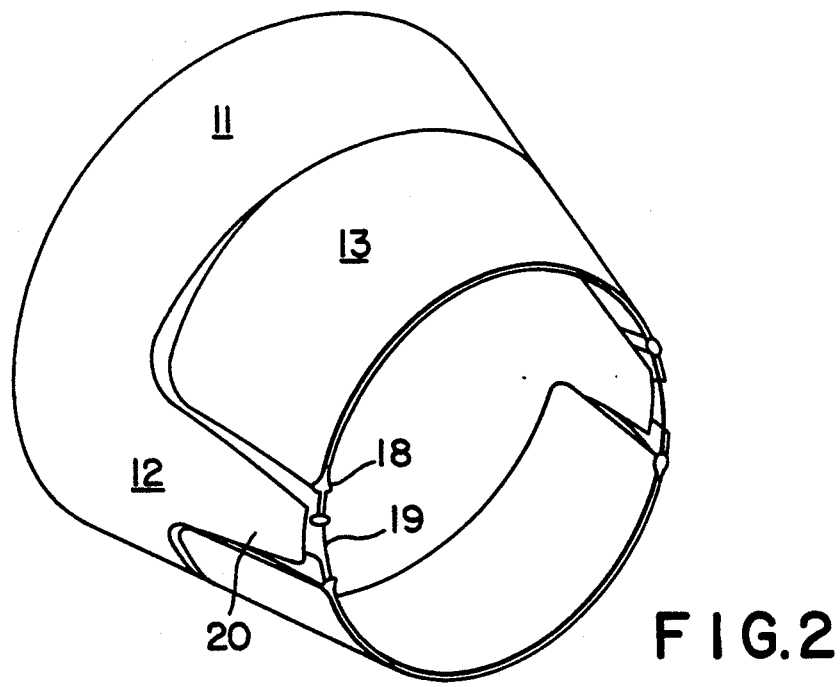
FIG. 2 is a view similar to FIG. 1 in the deployed position.
Figure 3:
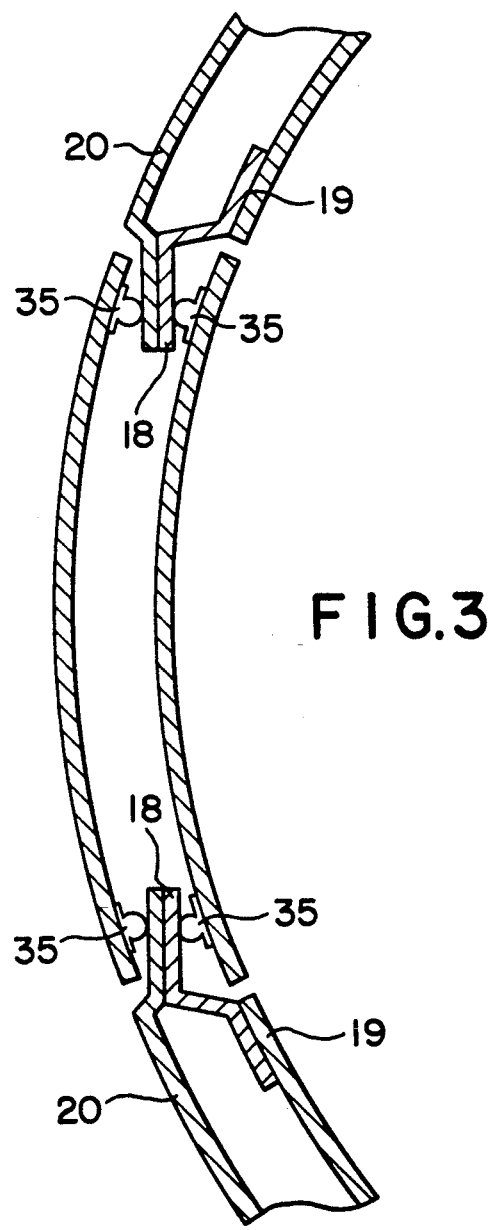
FIG. 3 is a cross-section on a larger scale of the portion indicated at III in FIG. 1.

When the half shells are installed, as represented in FIG. 1, a control signal to the motor M (FIG. 5) is emitted. Consequently, the motor drives into rotation the endless screw in a given direction. The nut 28 drives with this screw, so that, for example, to pull in the upstream direction each half rotating shell. As a result, each half shell rotates around its rotation axis A, which moreover leads to an increase of the nozzle exit area (FIG. 2). This area increase is of low amplitude and in general remains lower than 15%, and preferably, on the order of 8 to 12%. When the motor M drives into rotation the endless screw in the other direction, it induces the stowing of each half shell inside the fixed beams, and thus, decreased the exit area of the nozzle. Thus, one can see, that by acting on the rotational direction and on the number of revolutions imposed to the endless screws 29, the nozzle is moved according to the invention from a stowed position in which the nozzle exit area is minimum to a deployed position, in which the nozzle exit area is maximum, with a plurality of intermediate positions. Advantageously, the use of an endless screw as a rotating means allows the latching of each half shell to any position between the deployed position and the stowed position. In fact such a screw is a stable mechanism for all positions of the half shells. The selection of such a pivoting means allows the deletion of any other specific latching mechanism.

The advantage of such an embodiment lies in the fact that each pivoting half shell is of reduced dimensions. As the desired exit area variation is small, the pivoting half shells and their driving mechanism do not necessitate large parts, which leads to a negligible weight increase, in comparison with a non-variable nozzle, and by no means penalize the additional thrust increase obtained, which then is totally available.

Advantageously, during the variation of the exit area of the nozzle, the side edges, because of their increasing width, always remain maintained inside the fixed beams 12 between the internal and external envelopes forming the sliding tracks. During the rotation of the half shells, the seal always remains in contact with the side edge 18 of the half shells in their longitudinal portions, and with the recessing zone in their peripheral portions. Thus, in the stowed position, neither internal nor external aerodynamic discontinuity is generated by the presence of the pivoting half shells. In the deployed position, the induced discontinuities are very limited and are only the result of the non-circular deformation of the nozzle exit area.

Besides and advantageously, the external envelope of the fixed nozzle always covers the external envelope of the pivoting half shells, which ensures an excellent continuity of the external, profiles 33 of the fixed parts 11 and 20 and of the movable half shell part 13, for all angular positions of the half shells.

In the same way, the external envelope of the fixed beams 12 covers the side edges 18 of the half shells and form with the corresponding internal envelope a sliding track ensuring the guiding of the side edges 18 of each half shell.

The sealing is ensured by the installation of the seal on the longitudinal and peripheral fixed parts of the nozzle.

It is to be noticed that the internal profile of the nozzle is strictly convergent when this nozzle is in the stowed position. The cruise flight conditions are thus optimized (nozzle in the stowed position). On the other hand, this internal profile can, according to the selection of the position of the rotation axis A at the time of the design of the nozzle, be either strictly convergent, or convergent/divergent when this nozzle is in the deployed position (optimization of the take off and climb conditions).

Figure 6:
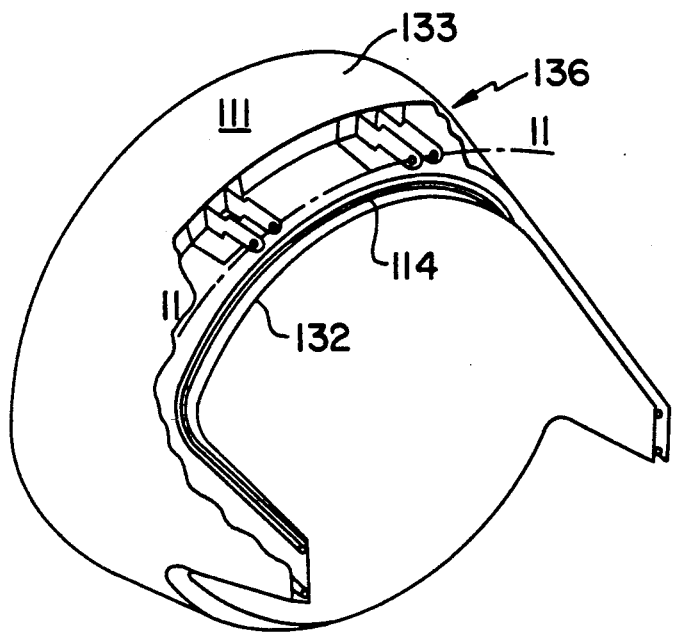
FIG. 6 is a perspective view of the nozzle fixed wall, according to a second embodiment of the invention.
Figure 7:
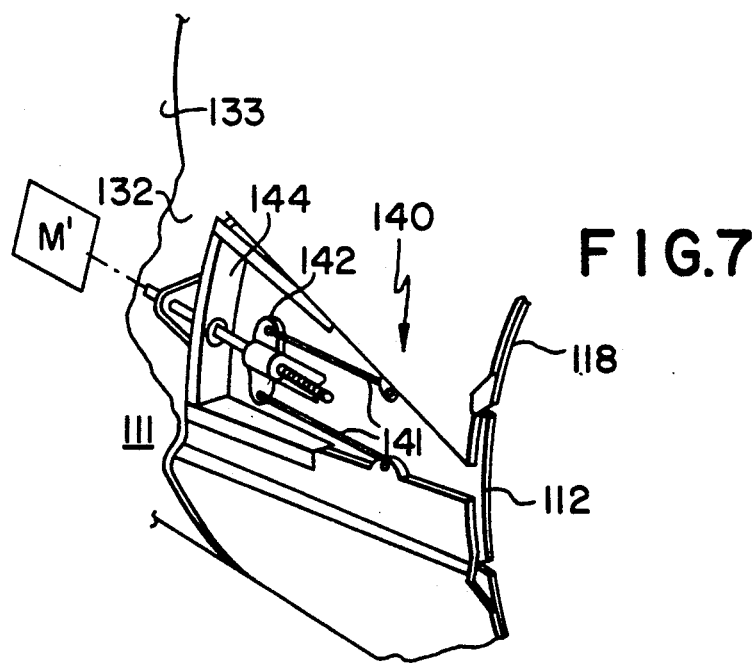
FIG. 7 is a fragmentary perspective view showing the rotating means used in the second embodiment of FIG. 6.

According to a second embodiment of the invention shown in FIGS. 6 and 7, rotating axis A' is located in the vicinity of the upstream edge 114 of the fixed wall 111. To this effect, rotation axis supports 136 or hinges are located near the upstream edge 114. The corresponding pivoting half shells 113 (not shown) have axis supports, adapted to be inserted into hinges 136. The common axis A' goes through the hinges 136 and the supports.

In this embodiment, the pivoting means 140 are located perpendicularly to the hinges 136 (FIG. 7) as previously. These pivoting means are thus located between the internal 132 and the external 133 envelopes of the fixed beams 112.

Each rotating means 140 is equipped with two links 141 which are attached by one of their extremities to the side edge 118 of the half shells. Their other extremity is attached to a nut 42 moving along an endless screw 143, when this latter is driven into rotation. This endless screw 143 is interdependent of the fixed wall by a supporting leg 144.

A motor M' (schematically shown in FIG. 7) instigates the rotation of the endless screw 143. The nut 142 moves, thus driving by means of the links 141, the half shells. These insert themselves more deeply in the tracks, or move away from them without however totally getting out of them.

A variable nozzle presenting the same advantages as the main embodiment is thus realized. Nevertheless, such an embodiment allows a better coordination of the positions of the pivoting half shells, because each pivoting means simultaneously controls the half shells. Any misalignment of the thrust in relation to the longitudinal axis of the aircraft is thus avoided.

Figure 8:
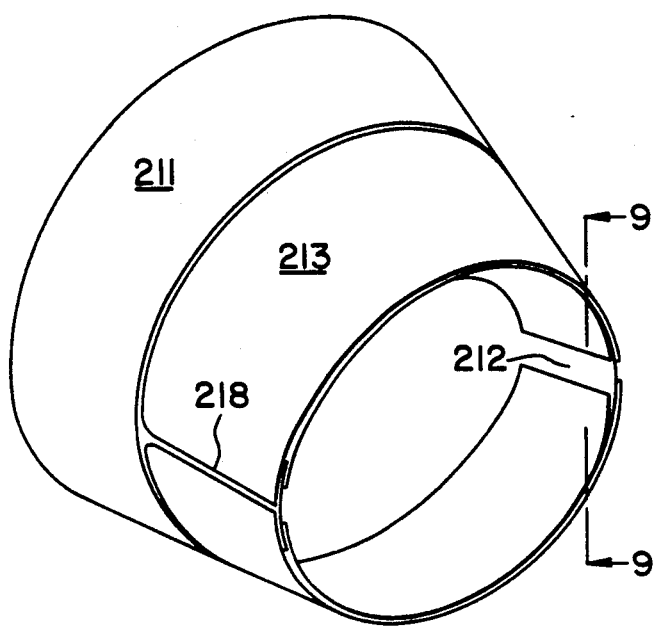
FIG. 8 is a perspective view showing a third embodiment of the invention.

According to a third embodiment of the invention (FIGS. 8 to 10), the external envelope of the fixed beams is deleted, this essentially to lighten the nozzle (FIG. 8). In this case, only remains the internal envelope 252 of the beams 212.

Figure 10:
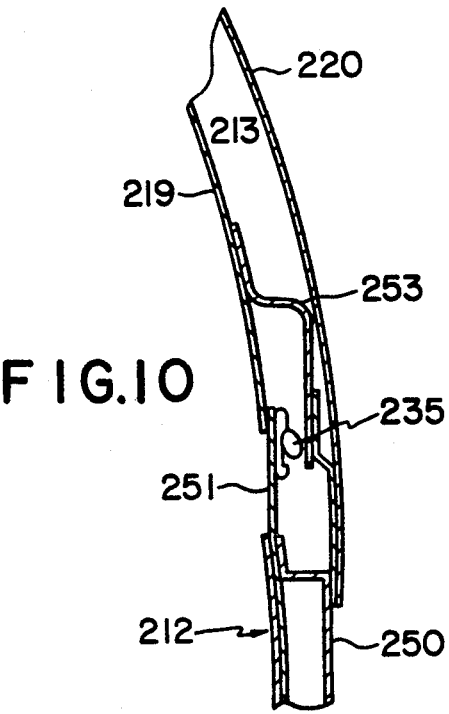
FIGS. 9 and 10 are cross-sectional views along line IX—IX of FIG. 8 showing respectively the penetration of a side edge of a half pivoting shell in a sliding track, in the stowed position and deployed position.
Figure 9:
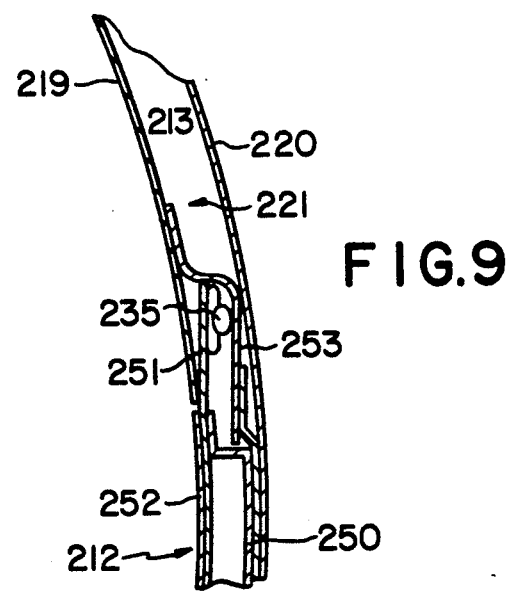

As can be better seen in FIGS. 9 and 10, the internal envelope 252 of the fixed beam 212 is fitted with a longitudinal reinforcement 250 forming a shoulder 220' and attaching together the internal envelope 252 to a sliding track 251 supporting the seal 235.

The lateral edge 218 of each of the half shells is structured such that the external envelope 220 is longer than the internal envelope 219. The free space 221 between these two envelopes is provided with a plate forming a supporting surface 253 attached to each of the internal and external envelopes of the pivoting half shell. When the half shells 213 are in the stowed position, the supporting plate 253 lies against the seal 235 and the external envelope 220 of each corresponding pivoting half shell (FIG. 9). When the half shell is in the deployed position (FIG. 10), the support plate 253 remains in contact with the sliding track 251, but the external envelope 220 of the half shell now only overlaps the shoulder 220' for a small part of its length. However, no air leak is permitted between the pivoting half shells and the fixed beams 212.

Such an embodiment allows lightening the structure of the nozzle according to the invention, and gives better access to the rotation axis and the pivoting means.

All the remarks which have been made relative to the main embodiment are, of course, applicable to the embodiments described above and notably everything which concerns the internal and external continuity of the air stream at the level of the separation between the fixed parts and the pivoting parts.

One will note that the sealing in one single piece can be of any appropriate shapes and dimensions. In particular such a seal can be a double. The overlapping of the internal and external envelopes, fixed and mobile, is vital to ensure a good airtightness according to the invention. To this effect, one will note that the internal envelope 19 of the pivoting half shells, overlaps the internal envelope 32 of the fixed wall, and in addition, the external envelope 20 of the half shells, lies under the external envelope 33 of the fixed wall. Consequently, the half shells are sandwiched between the internal envelope 32 and the external 33 of the fixed wall. This arrangement, advantageously avoids any aerodynamic discontinuities between the fixed and movable parts. The contour discontinuities which could appear between the internal envelopes 19 and 32 of the pivoting half shells and of the fixed wall, are in fact a function of the abscissa and ordinate position of the rotation axis A of the half shells. In order to avoid these discontinuities, the rotation axis A must be placed upstream enough relative to the upstream edge 16 of the half shells.

Figure 11:
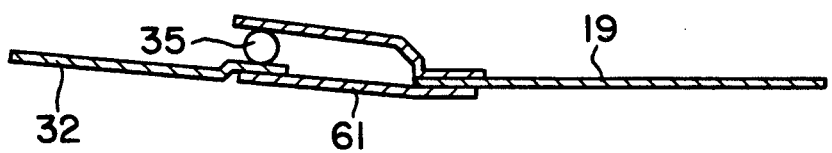
FIG. 11 is a schematic cross-sectional view showing the arrangements of the internal envelopes of the nozzle fixed wall and of a half shell, one relative to the other.

If this rotation axis A is not close enough to the upstream edge 16, then an annular skirt (FIG. 11) is interposed between the internal and external envelopes 19 and 32 of the half shells and of the fixed wall. This annular skirt is constituted by a plurality of spring plates 61 attached to the internal envelope 32 of the fixed wall, overlapping one another and covering the extremity of the internal envelope 19 of each half shell. This arrangement in the peripheral zone of the nozzle allows the reestablishment of the profiles between the internal envelopes 19 and 32.

Figure 12:
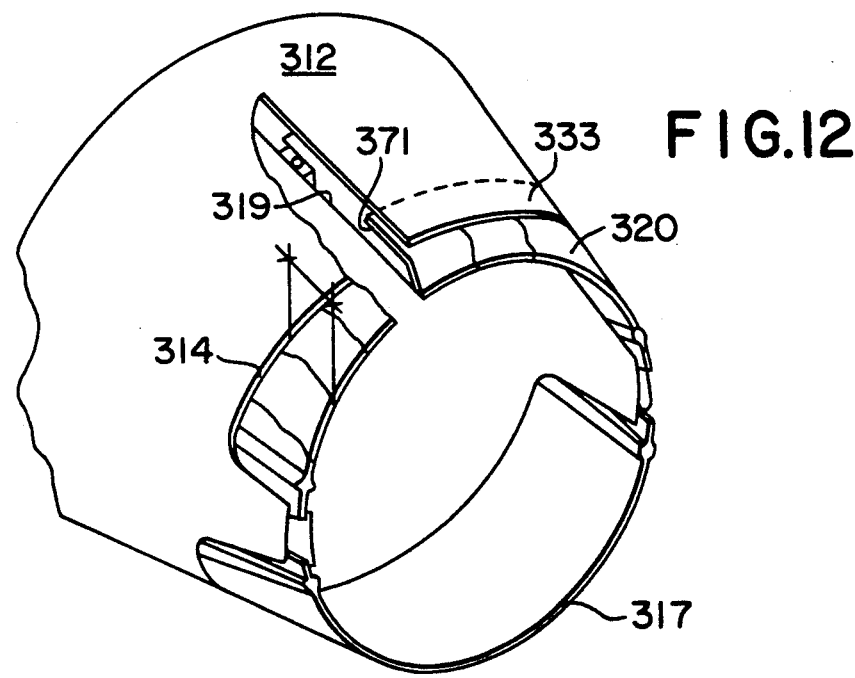
FIG. 12 is a fragmentary, schematic perspective view with parts in cross-section, showing a fourth embodiment according to the invention.
Figure 13:
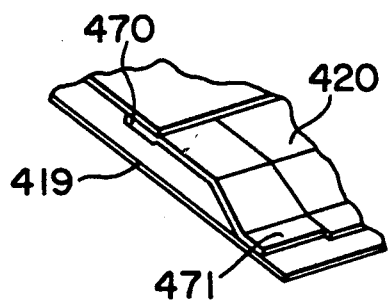
FIG. 13 is a fragmentary perspective view in partial cross-section of the extremity of the nozzle according to a fifth embodiment of the invention.

According to fourth and fifth embodiments (FIGS. 12 and 13), the external envelope of the pivoting half shells is totally removed. The pivoting half shells are now essentially composed of their internal envelope 319. The trailing edge 314 of the external envelope 333 of the fixed portion 312 of the nozzle is located upstream of the trailing edge 317 of the pivoting half shells by an amount L allowing the rotation of the said pivoting half shells to the required exit area. In order to avoid the external profile discontinuities between 312 and 319, spring plates, as shown in FIG. 12, are attached to the internal envelope 319 of each pivoting half shell, so that, when the half shells are pivoting, the free end 371 of these spring plates slide underneath the external envelope 333 of the fixed wall 312.

As an alternate, and according to a fifth embodiment of the invention (FIG. 13), the spring plates 420 are attached, for example, by riveting 470, to the external envelope 433 of the fixed wall. During the rotation of the pivoting half shell, the free end 471 of the spring plates slides on the internal envelope 419 of the pivoting half shell.

Such embodiments (FIGS. 12 and 13) allow the deletion of any gap or surface discontinuities between the external envelopes of the fixed and movable parts. In fact, because of their own elasticity, the spring plates 320 and 420 follow to the best the shape of the existing space between the external envelopes of the fixed and movable parts.

Of course, the present invention is not limited to the above mentioned embodiments, it includes any variant available to the man skilled in the art. For example, the pivoting means and/or the rotational means can be different from the ones described. Notably, pivoting means like hydraulic, electric, pneumatic actuators can be used. In case of use of such actuators, latching means (fitted in the actuators or located on the half shells) are necessary. In the same way, only two different positions of the half shells may be desired (deployed position and stowed position). The shapes and dimensions of the pivoting half shells are not limited to the one described. For example, each half shell, can very well be realized solid and no longer composed of internal and external envelopes. In the same way, the desired exit area variation can be greater than 15%.

I claim:
1. A variable area exhaust nozzle comprising:
a fixed nozzle wall,
a first pivotal half shell having a concave surface and a convex surface positioned in alignment with the fixed wall and hinged around a shaft located on a rotational axis upstream of said half shell and attached to the fixed wall, pivoting means for the half shell attached to the fixed wall and adapted to rotate the half shell relative to the fixed wall through a plurality of positions between a stowed position in which the gas exhaust area is at a minimum and a deployed position in which the gas exhaust area is at a maximum, a seal installed on the fixed wall and contacting the pivotal half shell, a second pivotal half shell having a concave face facing the concave face of the first half shell and hinged at an upstream portion to the fixed wall, two fixed beam extending rearward of the fixed wall between the two half shells and comprising overlapping sliding tracks for receiving the side edges of each half shell and said sliding tracks including seals contacting the side edges of each pivotal half shell, said fixed beams having an internal envelope provided with shoulders at the edges of said beams, so that the lateral edges of each half shell cooperate with said shoulders of the internal envelope and overlap at least a portion of the internal envelope.

2. A variable area exhaust nozzle according to claim 1, wherein said seal installed on the fixed wall and said seals inside the sliding tracks comprise a single seal extending about the periphery of the fixed wall and the two fixed beams, in contact with the same half shell.

3. A variable area exhaust nozzle as in claim 1 wherein said fixed beams comprise an external envelope, and wherein the lateral edges of each half shell extend between said internal and external envelopes forming sliding tracks.

4. A variable area exhaust nozzle according to claim 1, wherein the rotational axis of the half shells is located on said fixed wall in alignment with the fixed beams and on a diameter of said fixed wall, and wherein said pivoting means is located perpendicularly to the rotational axis on each half shell.

5. A variable area exhaust nozzle according to claim 1, wherein the rotational axis is a hinge, and wherein the pivoting means is located perpendicularly to this rotational axis at the level of the fixed beams.

6. A variable area exhaust nozzle according to claim 1, wherein the variation of the nozzle exit area between the stowed position and the deployed position is about 15%.

7. A variable area exhaust nozzle according to claim 1, wherein, the variation of the exit area of the nozzle is about 8 to 12%.

8. A variable area exhaust nozzle as in claim 1, and wherein said pivoting means for each half shell comprises an endless screw attached to the fixed wall, and an independent driving assembly for each half shell.

9. A variable area exhaust nozzle according to claim 8, wherein each endless screw is adapted to latch each pivoting half shell in any position.

10. A variable area exhaust nozzle according to claim 1, wherein each of said seal is a double seal.

* * * * *